E. GAUTHIER.
ANIMAL TRAP.
APPLICATION FILED AUG. 16, 1918.

1,296,282.

Patented Mar. 4, 1919.
2 SHEETS—SHEET 1.

Inventor
Ernest Gauthier
By
Marion & Marion
Attorneys

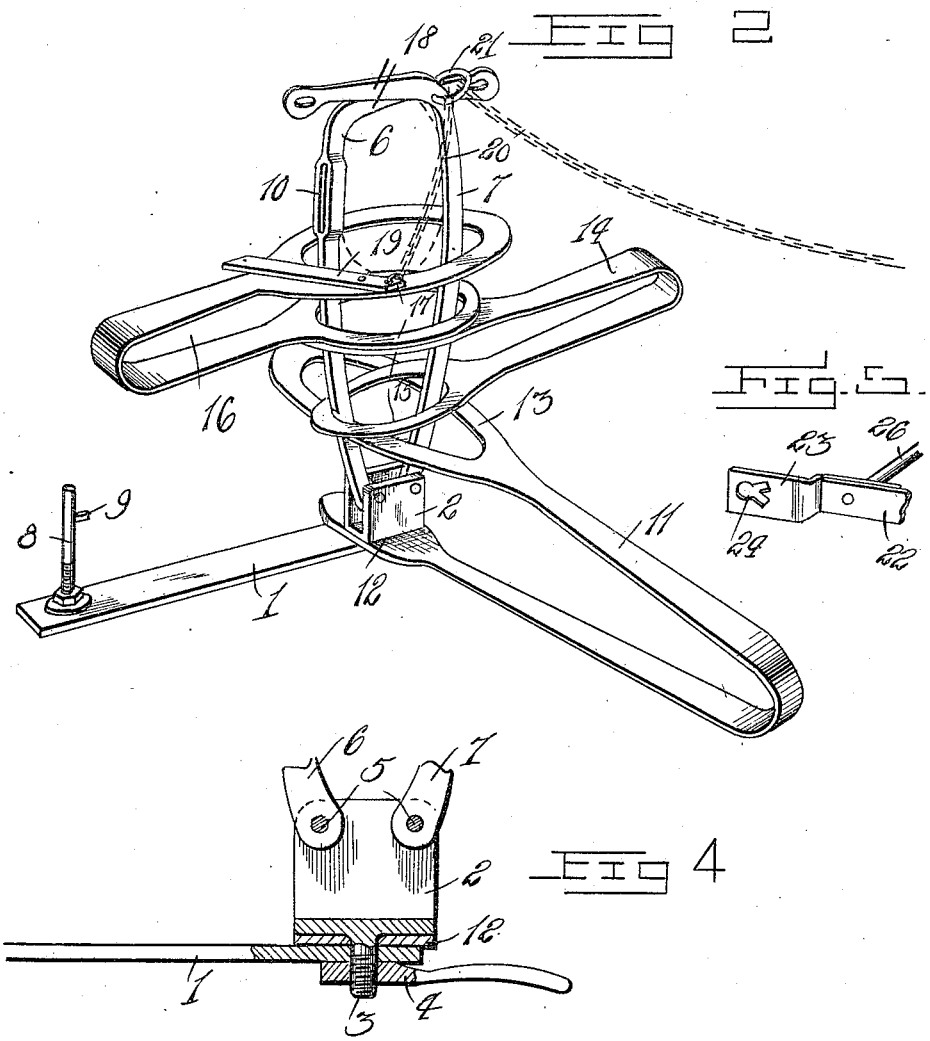

UNITED STATES PATENT OFFICE.

ERNEST GAUTHIER, OF CHEMIN GOUIN, HEBERT STATION, QUEBEC, CANADA.

ANIMAL-TRAP.

1,296,282.　　　　Specification of Letters Patent.　　Patented Mar. 4, 1919.

Application filed August 16, 1918.　Serial No. 250,108.

*To all whom it may concern:*

Be it known that I, ERNEST GAUTHIER, a subject of the King of Great Britain, residing at Chemin Gouin, Hebert Station, Province of Quebec, Canada, have invented certain new and useful Improvements in Animal-Traps; and I do hereby declare that the following is a full, clear, and exact description of the invention, such as will enable others skilled in the art to which it appertains to make and use the same.

The present invention relates to animal traps and more particularly to such traps that are used for catching beavers and like animals which travel within the waters.

Similar traps have been herebefore used but most of them catch the animal by his foot and as the results the foot of the animal is sometimes cut off and the animal is permitted to escape, or the traps badly injure the animal whereby the skin thereof will have but little or no value. The purpose of the present invention is to provide a strong and positive acting trap of this character which will grip the animal by the body without injuring the skin and one which will positively hold the animal after it has been caught within the trap.

With the above and other objects in view which will hereinafter appear as the description continues, the invention consists of the novel features of construction, combination and formation of parts as will be hereinafter more fully described and particularly pointed out in the appended claims.

In the accompanying drawings has been shown a simple and preferred form of the invention, it being, however, understood that no limitation is necessarily made to the precise structural details herein exhibited, but the right is hereby reserved to any changes, alterations or modifications to which recourse may be had that come within the scope of the claims without departing from the spirit of the invention or sacrificing the efficiency of the same.

In the accompanying drawings:

Fig. 2 is a similar view of the trap when the same has been sprung;

Fig. 4 is a detail sectional view.

Fig. 5 is a perspective view of the latch.

Referring now more particularly to the accompanying drawings wherein like and corresponding parts are designated by similar reference characters throughout the several views.

Figure 1:
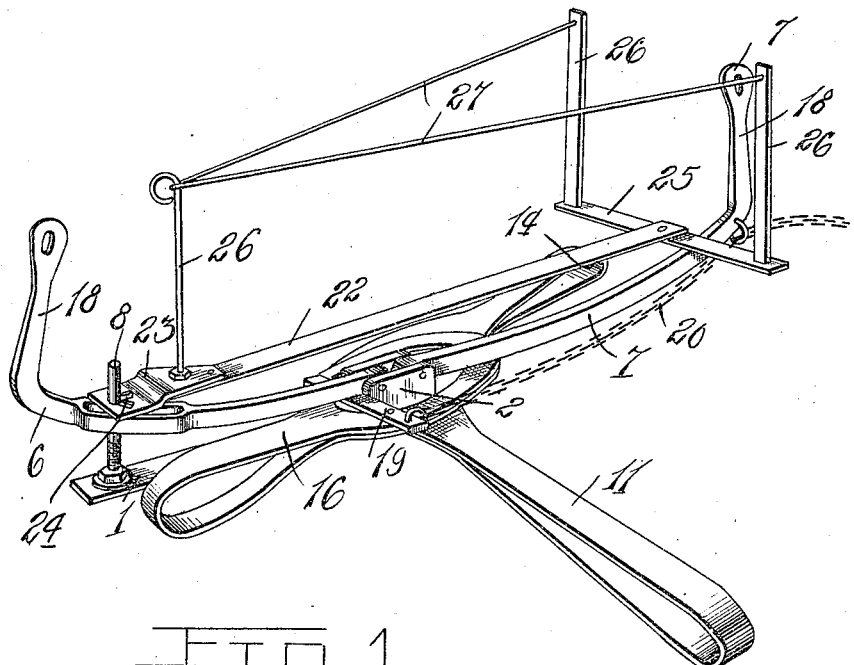
Figure 1 is a perspective view of the trap embodying the present invention when opened and presented for use.
Figure 3:
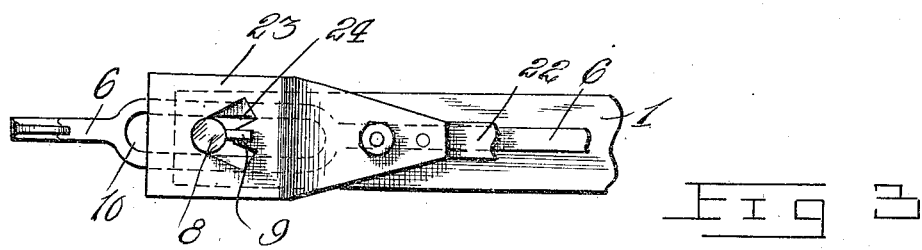
Fig. 3 is a detail plan view of the latch.

The trap comprises a base plate 1 which has connected to one end thereof a U-shaped bearing block 2. This bearing block is provided with a threaded projection 3 which extends down through the plate 1 and a hand operated nut 4 engages this threaded projection 3 for locking the bearing block 2 to the base plate 1. Pivotally mounted within the bearing 2, as at 5, are the jaws 6 and 7. Carried by the opposite end of the plate 1 is a vertical locking post 8 having a lateral projection 9, and the jaw 6 is provided with a slot 10 which is to receive the post 8 when the jaws are opened. A base leaf spring 11 is employed having one end 12 rigidly secured between the bearing 2 and the plate 1 and its opposite end is provided with a loop 13 which encircles the jaws 6 and 7. An intermediate leaf spring 14 is employed having the loops 15 which also encircle the jaws 6 and 7, and an upper leaf spring 16 is employed having the loops 17 which also encircle the jaws 6 and 7. Each of the jaws is provided with a long curved arm and a shorter right angular arm 18 which may be used as handles for opening the trap and which encircle the body of the animal when the latter has been caught. Pivotally secured to the upper loop of the spring 16 is a bar 19 having a chain 20 connected to one end thereof and this chain 20 extends through a loop 21 secured to the jaw 7 and its opposite end is to be anchored so as to prevent the animal from escaping with the trap. The trigger comprises a bar 22 having a plate 23 secured to one end thereof and this plate 23 is provided with a V-shaped slot 24. When the trap is retained in opened position the post 8 will rest within the apex of this V-shaped slot 24 and the lug projection 9 rests upon the upper face of the plate 23, whereby the jaw 6 is held in opened position but when this plate has been swung about the post 8 so that the lug projection 9 registers with either arm of the V-shaped slot 24, the plate 23 will be released and the jaws permitted to close. One end of the bar 22 is provided with a lateral bar 25 and the vertical bars 26 are supported upon the bars 22 and 25. These bars 26 are connected by a suitable wire or cable 27.

In using the trap the chain 20 is anchored in a suitable place and the jaws 6 and 7 are swung over to the position as shown in Fig. 1. The plate 23 carried by the trigger is inserted over the post 8 and locks the jaw 6 in opened position, but the jaw 7 is free and assumes the position as shown in Fig. 1 due to its own weight. When the jaws are opened the three leaf springs are depressed, but should an animal touch the wire 27 of the trigger the latter will swing about the post 8 as one end thereof is free and as this trigger swings about the post 8 the lug 9 registers with the V-shaped slot and the tension of the leaf springs forces the trigger from the post and closes the jaws so that they will assume the position as shown in Fig. 2. The body of the animal is caught between the jaws and sufficient pressure is upon the body of the animal to retain the latter within the jaws without injuring its body. Should the animal try to escape with the trap, greater tension will be exerted upon his body, due to the fact that one end of the chain 20 is anchored and as a further pull is exerted upon the trap this chain will have a tendency to draw the jaws of the trap together and keep the upper loop of the spring 16 in an elevated position.

From the foregoing it is obvious that a trap constructed in accordance with the present invention will securely grip and hold the animal, and at the same time prevent any injury to the animal's skin which is most desired.

Having thus fully described my invention, what I claim as new and desire to secure by Letters Patent is:

1. An animal trap comprising a pair of swinging jaws, springs for closing said jaws, a vertical post, said post adapted to extend within one of said jaws when the latter are in their open or set position, and a trigger detachably connected to and adapted to swing around said post substantially as and for the purpose set forth.

2. An animal trap of the character described comprising a base portion, a pair of jaws pivotally connected thereto, a plurality of leaf springs for closing said jaws, loops formed with said leaf springs, said loops adapted to encircle said jaws, a horizontally movable trigger, said trigger adapted to lock one of said jaws to said base for retaining the same in opened position, and means whereby when said trigger has been swung in a horizontal direction the jaws will be released and said springs will cause the same to be closed substantially as and for the purpose specified.

3. An animal trap of the character described comprising a base, a pair of jaws pivotally connected to said base, a plurality of leaf springs, the opposite ends of said leaf springs being provided with loops, said loops adapted to encircle said jaws, a vertical post carried by said base, a projection carried by said post, a trigger adapted to swing about said post, and said trigger having a slot therein for permitting said lug projection to pass therethrough when the trap has been released substantially as and for the purpose specified.

4. An animal trap of the character described comprising a base, a pair of spring actuated jaws each having one end pivotally secured to said base, said jaws each comprising a curved body portion and a right angular end portion, a vertical post carried by said base, one of said jaws having a slot therein for receiving said post, a trigger adapted to be pivotally connected to said post, and an anchor chain connected to the trap substantially as and for the purpose specified.

In witness whereof I have hereunto set my hand.

ERNEST GAUTHIER.